Figure 1:
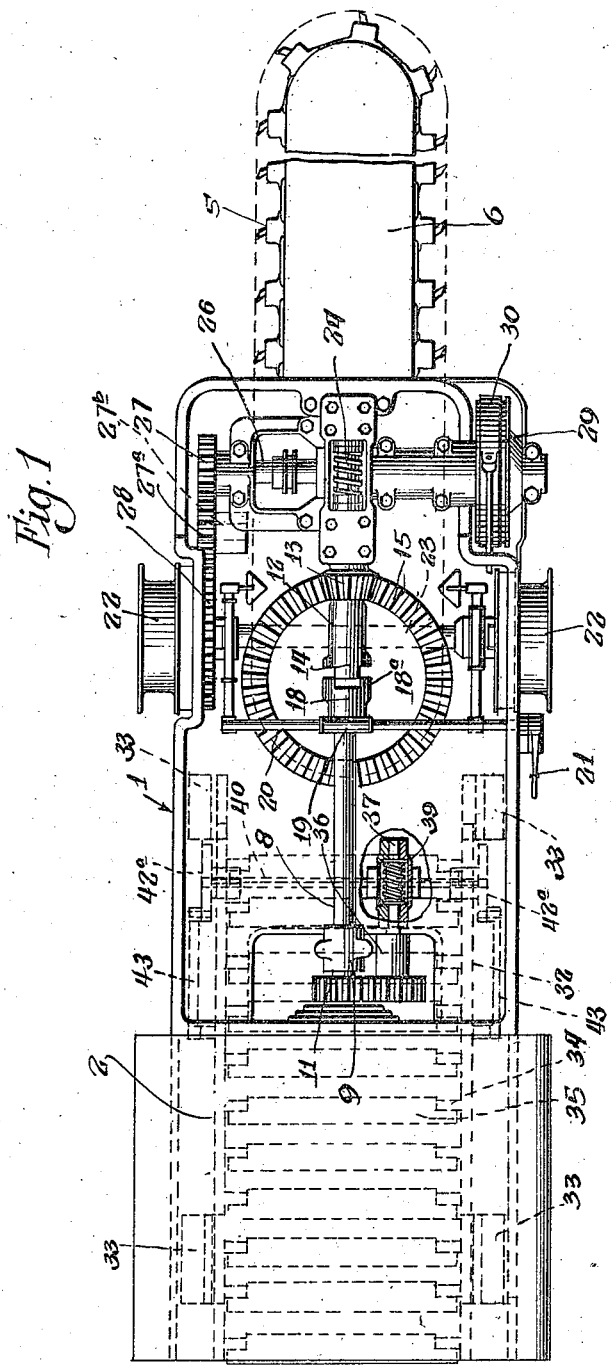

Feb. 8, 1927.

T. E. PRAY

MINING MACHINE

Filed Dec. 30, 1924

1,616,597

2 Sheets-Sheet 1

Witness
Herbert Buehler

Inventor
Thomas E. Pray
by Clarence F. Poole
Attorney

Feb. 8, 1927.
T. E. PRAY
1,616,597
MINING MACHINE
Filed Dec. 30, 1924    2 Sheets-Sheet 2
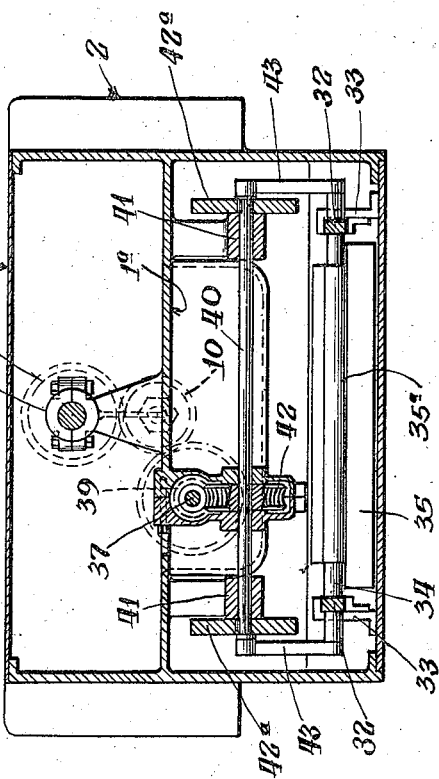
Witness
Herbert Buehler
Inventor
Thomas E. Pray
by Clarence F. Poole
Attorney Patented Feb. 8, 1927.

1,616,597

UNITED STATES PATENT OFFICE.

THOMAS E. PRAY, OF CHICAGO, ILLINOIS, ASSIGNOR TO GOODMAN MANUFACTURING COMPANY, OF CHICAGO, ILLINOIS, A CORPORATION OF ILLINOIS.

MINING MACHINE.

Application filed December 30, 1924. Serial No. 758,938.

This invention relates to improvements in mining machines and more particularly to mining machines of the low vein type, so called because of their ability to be operated in rooms having relatively low ceilings and to cut close to the floor.

It is to be understood that machines of the type herein disclosed are designed to be advanced transversely of the mine wall and from right to left, with the body or main portion of the machine standing substantially at right angles to the wall face. The cutter bar extends from the forward end of the machine, and into the wall or vein being cut, the cutter chain carried thereby carrying the cuttings outwardly from the kerf and into a space in the forward part of the machine body.

To clear the cuttings as they are removed, is the purpose of the device embodying the present invention, the same acting in conjunction with the cutter chain, to deliver the cuttings clear of the machine as the cutting progresses, as will now be described in connection with the accompanying drawings, in which:

Figure 1 is a top plan view of the machine with the top wall of the frame housing removed;
Figure 2 is a view in side elevation of the machine with the side wall of the frame housing broken away; and Figure 3 is a cross sectional view taken on line 3—3 of Figure 2.
The machine embodying the invention consists generally of a frame housing 1, in the form of a rectangular casing, elongated lengthwise of the machine and relatively reduced in height. Just behind the housing 1, is the motor housing 2, a separate casing, containing the motor 3. The frame and motor housings are joined end to end, both being bolted to a bottom plate or pan 4, on which the machine slides on the mine floor.
As clearly shown in Figures 2 and 3, the housings are elevated above the bottom plate, there being a space between the bottom walls 1ª and 2ª of the housings and the plate, varying from about a quarter of the total height of the machine between the motor housing and the bottom plate, to a little more than half throughout the forward end of the machine and adjacent the path of the cutter chain 5, which is carried on the cutter bar 6, projecting from beneath the forward end of the machine a distance of 8 or 10 feet. The cutter chain is endless and consists of links carrying suitable cutting tools or members. The forward end of the cutter bar carries an idle sprocket (not shown in detail) on which the chain travels in changing direction. Immediately beyond the rear of the cutter bar and centrally of the frame housing is another sprocket 7, likewise carrying the cutter chain, this sprocket being driven by mechanism operatively connected with the motor 3, as follows:

Extending lengthwise of the frame housing is a main drive shaft 8, supported at its ends in bearings 9, 9, near each end of the housing. The armature shaft of the motor is extended through the adjacent end walls of the housings, into the frame housing, and carries at its end a spur gear 10. The main drive shaft 8 carries a spur gear which meshes with the spur gear 11, said shaft being offset above the axis of the armature shaft as shown in Figure 3.

Loosely mounted in the main shaft 8 and at its forward end is a sleeve 12, having an integral bevel pinion 13 at its forward end and clutch teeth 14 at its rear end. The pinion 13 meshes with and drives a bevel gear 15 keyed to the upper end of a vertical stub shaft 16, journalled in a sleeve bearing 17, cast integral with the bottom wall of the frame housing. At the lower end of the stub shaft 16 is the cutter chain driving sprocket 7, already mentioned. Clutch mechanism is provided for interrupting the movement of the cutter chain and consisting of a shiftable clutch sleeve 18, keyed to the main drive shaft 8, adjacent the pinion sleeve 12, said clutch sleeve having clutch teeth 18ª at its forward end adapted to engage the complementary teeth on the pinion sleeve 12.

Clutch shifting mechanism consisting of a shifting yoke 19, a rock shaft 20, and a clutch lever 21 (Figure 1) are provided for shifting the clutch teeth into and out of engagement.

In addition to driving the cutter chain, the main shaft also drives two cable drums 22, 22, mounted on a shaft 23, extending transversely of the frame housing and acting to wind and pay out the cables, on which the machine depends for its movement. The drive from the main shaft 8 to the drums 22 consists of a worm 24 keyed to the shaft at its forward end, meshing with a worm wheel 25, carried on a transverse shaft 26 immediately below, said shaft carrying a spur gear 27 at one end, meshing with an idler 27$^a$ mounted on a stub shaft 27$^b$, said idler meshing with a spur gear 28 on the drive shaft 23. At the opposite end of the shaft 26 is mounted a brake drum 29 and hand operated brake band 30, but since these parts are not intimately connected with the cutting action of the machine they need not be described in greater detail.

Referring now to the mechanism embodying the improvement of the present invention, the same consists of a reciprocating conveyor 31, located for the most part in the space between the motor housing and the bottom plate, and extends from a point just rearwardly of the cutter chain to the rear end of the machine, where an opening is provided the full width of the space between the bottom plate and the motor housing. This reciprocating conveyor consists of two endwise movable bars 32, 32, spaced above the bottom plate, and extending parallel with each other on opposite sides of the longitudinal space beneath the motor housing. These bars are slidably supported in pairs of guide blocks 33, 33, fixed to the bottom plate near the ends of the bars, said blocks having guideways in which the bars ride. Extending between the bars 32, 32, are a series of parallel transverse rods 34, spaced apart equally after the manner of the rungs of a ladder. Journalled on these rods are a series of scraper blades 35, extending practically the full width between the side bars, with their lower edges engaging the surface of the bottom plate 4, in a position slightly inclined toward the rear of the machine. The journal bearing is formed by integral tubular sleeve 35$^a$ extending lengthwise of the blades, just below the top edges thereof.

Reciprocating motion is imparted to the conveyor from the motor 3, by the following mechanism:

Journalled in a horizontal bearing 36, offset a short distance below and to one side of the axis of the armature shaft, is a counter shaft 37, having a spur gear 38, meshing with the motor drive pinion 10, and at its other or forward end with a worm 39. Immediately below the worm 39, is a transverse counter shaft 40, extending crosswise of the frame housing below its bottom wall 1$^a$, and supported just inwardly from its ends by means of journal bearings 41, 41, depending from said bottom wall 1$^a$. Keyed to the shaft 40, is a worm wheel 42, meshing with the worm 39, and at its ends are crank discs 42$^a$, 42$^a$. Connecting rods 43, 43 are pivotally connected with the crank discs and extending rearwardly and downwardly therefrom, each rod having pivotal connection at its lower end with each of the reciprocating bars 32, 32.

The motion imparted to the bars and the blades carried thereby, from the motor, is a relatively slow reciprocating motion from front to rear, the stroke being about 12 inches. The action of this reciprocating conveyor will be understood from the following:

The cutter chain travels in a counter-clockwise direction, thus carrying the cuttings outwardly from the kerf as the machine advances along the mine wall from right to left. The body of the machine being close to the mine wall, the cuttings are carried into the space at the forward end thereof and discharged in the vicinity of the rear end of the cutter chain. As the cuttings accumulate they are gradually pushed rearwardly and between the blades 33, of the reciprocating conveyor. The rearward stroke of the blades carries between them a quantity of the cuttings. When the end of the stroke is reached the cuttings in front of each blade are dropped and during the return stroke the blades swing upwardly and ride over the material to the point where the next rearward stroke is commenced, whereupon the blades again assume a more upright position in scraping contact with the bottom plate, and carry forward the material, which on the previous stroke had been advanced by the blade, just forwardly thereof. In short, the accumulation of cuttings is constantly moved rearwardly step by step and in small quantities or batches, which are successively discharged from the rear of the machine, to be disposed of in any suitable manner, depending on the character of the cuttings.

While I have shown and described one form in which my invention may be embodied, it will be understood that the construction and arrangement of the various parts may be altered without departing from the spirit and scope thereof. Furthermore, I do not wish to be understood as limiting myself to the particular construction illustrated excepting as it may be specifically limited in the appended claims.

I claim as my invention:

1. A mining machine, comprising a machine frame, a cutter bar supported by and extending from said machine frame, a cutter chain carried by said cutter bar, and acting to discharge the cuttings adjacent the rear end of said cutter bar, and a conveyor extending from said cutter bar to and opening at the rear of said machine and comprising a reciprocating member having blades spaced apart lengthwise thereof and arranged to advance the cuttings progressively to said opening.

2. A mining machine, comprising a machine frame, a plate spaced below said frame, a cutter bar extending forwardly from said frame and supporting an endless cutter chain operating to deliver the cuttings into the space between said frame and plate, and a reciprocating conveyor in said space and extending from the rear end of said cutter chain to an opening at the rear of the machine and comprising blades movable in contact with the bottom plate to advance the cuttings progressively from the rear end of said cutter chain to said opening.

3. A mining machine comprising a machine frame, a bottom plate spaced from said frame, a motor supported in said frame, a cutter bar extending from the forward end of said frame and carrying a cutter chain, means for driving said chain from said motor whereby the cuttings therefrom are delivered into the space between said frame and bottom plate adjacent the rear end of said cutter bar, and a conveyor extending lengthwise of said machine and within said space from said cutter bar to an opening at the rear of said space and comprising an endwise reciprocating frame having a series of transverse blades hinged to swing into and out of contact with the bottom plate and adapted in the rearward movement to advance the cuttings progressively toward said opening, and mechanism driven by said motor for imparting reciprocating movement to said frame.

4. A mining machine comprising a machine frame mounted on a bottom plate spaced below said frame, a motor supported in said frame, a cutter bar extending from the forward end of said frame and carrying a cutter chain in driving connection with said motor, and a conveyor extending longitudinally of said space from said cutter bar to an opening at the rear of said space and comprising an endwise slidable frame having a series of parallel blades spaced apart along said frame and hinged along their upper edges to permit them to swing into and out of contact with said bottom plate in the movement of said frame in opposite directions.

5. A mining machine comprising a machine frame, a bottom plate spaced from said frame, a cutter bar extending from the forward end of said frame and carrying a cutter chain, a motor supported in said frame and in driving connection with said cutter chain, and a conveyor extending lengthwise of the machine and within said space between said frame and bottom plate from said cutter bar to an opening at the rear of said space, and comprising an endwise reciprocating frame having a series of hinged blades extending transversely of said frame and normally positioned for contact with the bottom plate in their rearward movement to advance the cuttings progressively toward said opening, and to swing upwardly in the forward movement thereof, and mechanism driven by said motor for imparting reciprocating movement to said frame.

6. A mining machine comprising a machine frame, a bottom plate spaced from said frame, a motor supported in said frame, a cutter bar extending from the forward end of said frame and carrying a cutter chain, means for driving said chain from said motor whereby the cuttings therefrom are delivered into the space between said frame and bottom plate adjacent the rear end of said cutter bar, and a conveyor extending lengthwise of said machine and within said space, from said cutter bar to an opening at the rear of said space, and comprising a pair of endwise slidable bars, a series of parallel blades hinged between said bars and adapted to swing into and out of contact with said bottom plate to advance the cuttings rearwardly during their stroke in one direction and to ride over the material during the stroke in the opposite direction, and driving mechanism between said motor and conveyor, comprising crank discs and connecting rods connected with said bars.

Signed at Chicago, in the county of Cook and State of Illinois, this 27th day of December, A. D. 1924.

THOMAS E. PRAY.